(12) United States Patent
Miyazaki et al.

(10) Patent No.: US 6,287,733 B1
(45) Date of Patent: Sep. 11, 2001

(54) LIQUID CRYSTAL DISPLAY DEVICE

(75) Inventors: Daisuke Miyazaki, Kamakura; Shoichi Kurauchi, Yokohama; Hitoshi Hatoh, Yokohama; Teruyuki Midorikawa, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/078,667

(22) Filed: May 14, 1998

Related U.S. Application Data

(63) Continuation of application No. 08/709,661, filed on Sep. 9, 1996, now Pat. No. 5,757,451.

(30) Foreign Application Priority Data

Sep. 8, 1995 (JP) .................................................... 7-231841

(51) Int. Cl.$^7$ ............................ G02B 5/20; G02F 1/1335; G02F 1/1339
(52) U.S. Cl. .............................. 430/7; 430/321; 349/106; 349/156
(58) Field of Search ................................. 430/7, 20, 321; 349/106, 156

(56) References Cited

U.S. PATENT DOCUMENTS

| | | | |
|---|---|---|---|
| 4,547,798 | 10/1985 | Matsumoto et al. | 430/7 |
| 5,039,204 | 8/1991 | Choi | 349/106 |
| 5,368,976 | 11/1994 | Tajimi et al. | 430/7 |
| 5,680,187 | * 10/1997 | Nagayama et al. | 349/110 |
| 5,815,232 | * 9/1998 | Miyazaki et al. | 349/155 |
| 5,917,572 | * 6/1999 | Kurauchi et al. | 349/156 |

FOREIGN PATENT DOCUMENTS

| | | | |
|---|---|---|---|
| 56-140324 | 11/1981 | (JP) . | |
| 61-183625 | 8/1986 | (JP) . | |
| 62-90622 | 4/1987 | (JP) . | |
| 63-183421 | 7/1988 | (JP) | 349/110 |
| 3-059522 | * 3/1991 | (JP) . | |
| 4-93924 | 3/1992 | (JP) . | |
| 5-196946 | 8/1993 | (JP) . | |

* cited by examiner

Primary Examiner—John A. McPherson
(74) Attorney, Agent, or Firm—Finnegan, Henderson, Farabow, Garrett & Dunner, L.L.P.

(57) ABSTRACT

A liquid crystal display element includes a pillar-shaped spacer as a stack of a plurality of color layers, which exists on either an active matrix substrate or an opposite substrate facing to the former substrate. An impurity concentration and an impurity elution quantity of the color layer closest to a switching element among the color layers constituting the pillar-shaped spacer are made lowest among the plurality of color layers, or a bridging density of a resin is made highest among the color layers, thereby restraining an influence of the impurities upon the switching element and enhancing a display quality and a yield. Damages to contact areas when the active matrix substrate is disposed facing to the opposite substrate are reduced by making a hardness of the farthest layer from a surface of a substrate on which the pillar-shaped spacer is disposed lowest among the color layers.

12 Claims, 6 Drawing Sheets

PILLAR-SHAPED
SPACER    FILTER

1ST COLOR

2ND COLOR

3RD COLOR

FIG. 5A
PILLAR-SHAPED SPACER     FILTER
1ST COLOR
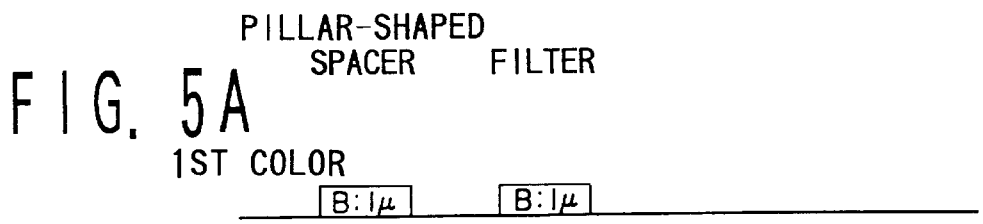
FIG. 5B
2ND COLOR
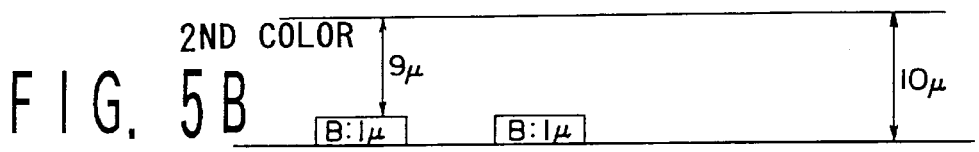
FIG. 5C
FIG. 5D
3RD COLOR
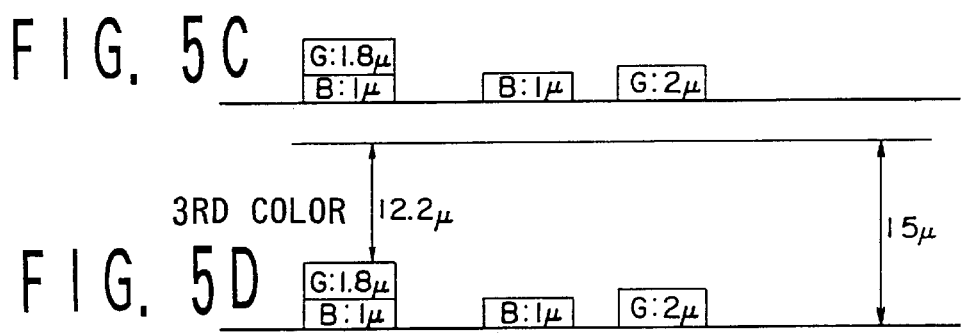
FIG. 5E
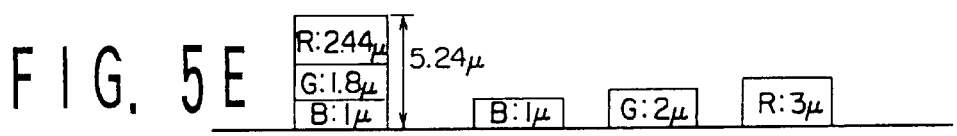

PILLAR-SHAPED
SPACER     FILTER

FIG. 6A

1ST COLOR
R          | R:2μ |        | R:2μ |

FIG. 6B

2ND COLOR
G          ↕ 8μ                              ↕ 10μ
           | R:2μ |        | R:2μ |

FIG. 6C

| G:1.6μ |
| R:2μ  |          | R:2μ |    | G:2μ |

FIG. 6D

3RD COLOR    ↕ 4.4μ
B
| G:1.6μ |                                    ↕ 8μ
| R:2μ  |          | R:2μ |    | G:2μ |

FIG. 6E

| B:1.1μ |
| G:1.6μ |  ↕ 4.7μ
| R:2μ  |          | R:2μ |    | G:2μ |    | B:2μ |

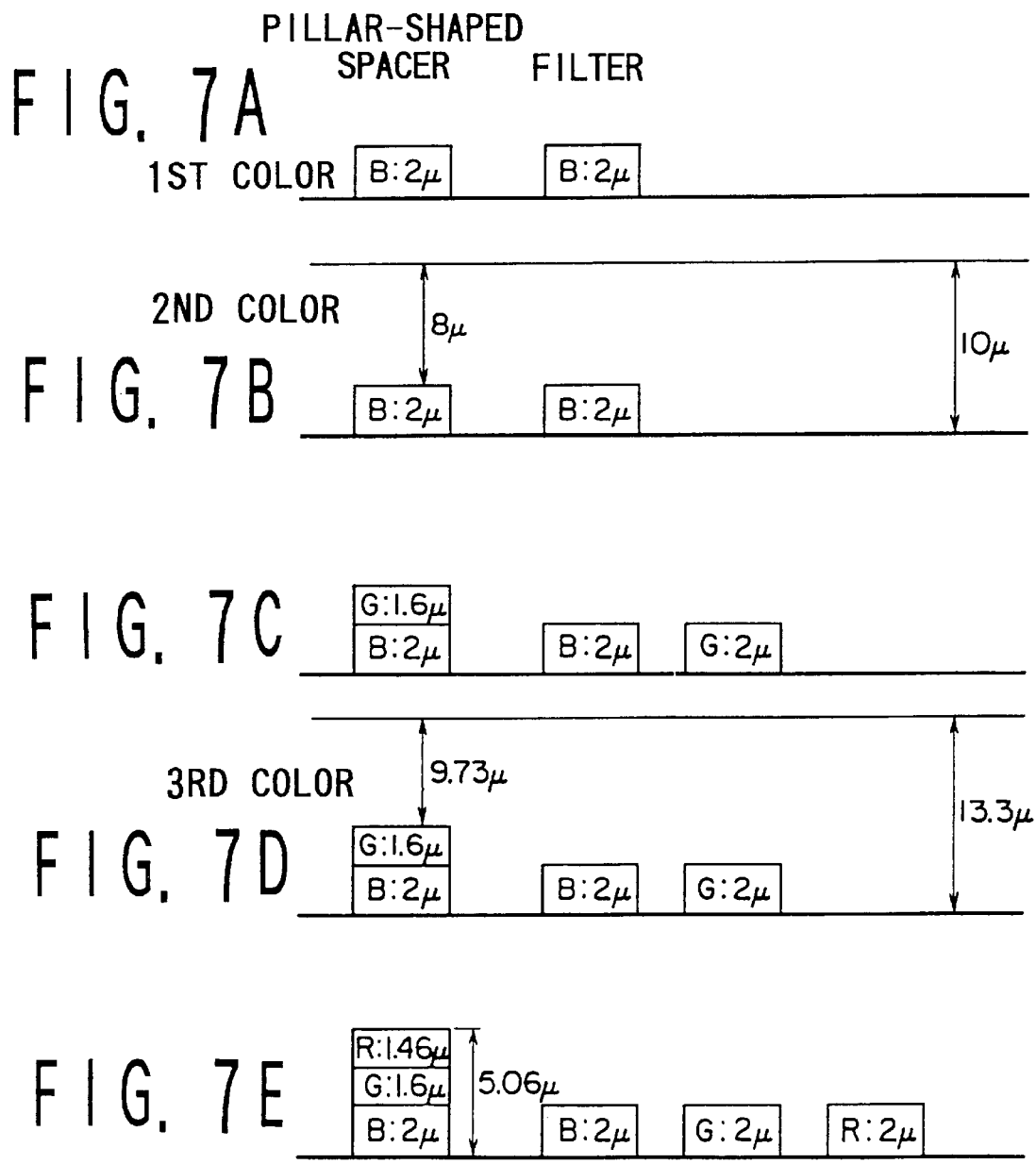

LIQUID CRYSTAL DISPLAY DEVICE

This is a division of application Ser. No. 08/709,661, filed Sep. 9, 1996, now U.S. Pat. No. 5,757,451, which is incorporated in its entirety herein by reference.

BACKGROUND OF THE INVENTION

1. Field of the Invention

The present invention relates generally to a liquid crystal display device and, more particularly, to a liquid crystal display device exhibiting a high display performance and a high yield and requiring a small number of steps.

2. Description of the Background Art

A liquid crystal display device generally employed nowadays is constructed such that two glass substrates having electrodes are set in a face-to-face (opposing) relationship, peripheries of these two substrates exclusive of a liquid crystal filling port are fixed by a bonding agent, the liquid crystal is interposed between the two substrates, and the liquid crystal filling port is sealed by a sealing agent. Plastic beads or the like having a uniform particle diameter are dispersed between the substrates as spacers for keeping a fixed distance between these two substrates.

A liquid crystal display device for color display includes color filters R, G and B of color layers that are disposed on one of the two glass substrates. For instance, a color dot matrix liquid crystal display device based on a simple matrix drive includes a Y-substrate having a Y-electrode subjected to band-like patterning in a lateral (Y) direction and an X-substrate having color layers under the X-electrode subjected to the band-like patterning in a vertical (X) direction, wherein the X- and Y-substrates are provided in a face-to-face relationship so that the X-and Y-electrodes are substantially orthogonal to each other, and a liquid crystal material is sealed in therebetween. The liquid crystal display device may involve the use of display systems such as, e.g., TN (Twisted Nematic) type, STN (Super Twisted Nematic) type, GH (Guest Host) type, or ECB (Electrically Controlled Birefringence) type and a dielectric liquid crystal. The sealing agent involves the use of, e.g., a bonding agent of a thermosetting type or an ultraviolet ray hardening acrylic or epoxy group.

Furthermore, the color active matrix drive liquid crystal display device is constructed of a TFT active matrix substrate, i.e., an active matrix substrate with a switching element, e.g., a thin-film transistor (TFT) with a semiconductor layer composed of amorphous silicon (a-Si), and a pixel electrode, a signal electrode and a gate electrode that are connected thereto, and also an opposite substrate disposed in the face-to-face relationship with the TFT active matrix substrate. The color layers R, G and B are disposed on the opposite substrate. Disposed on a screen peripheral portion is a silver paste serving as an electrode transfer member (transfer) for applying a voltage to the opposite substrate from above the active matrix substrate. The two substrates are electrically connected by this electrode transfer member, and the liquid crystal material is sealed in between those two substrates. Furthermore, polarizing plates are secured on both side of those two substrates, and light beams from these polarizing plates are used for a display shutter when displaying a color image.

In the liquid crystal display device using the plastic beads as a spacer, however, alignments of the liquid crystal peripheral to the spacer, which are scattered between the two substrates, are disordered, resulting in such a problem that the contrast declines due to a leakage of light beams from the spacer peripheral portion. Moreover, the spacers are hard to disperse uniformly and are arranged with ununiformity during a step of dispersing the spacers on the substrate. This results in a display defect, which in turn brings about a decreases in yield.

Under such circumstances, there is proposed a liquid crystal display device using no plastic beads, wherein a pillar-shaped spacer is disposed by stacking a plurality of color layers of color filters.

However, the sequence of forming those color layers is not necessarily fixed and, it may happen, changes depending on a situation in terms of manufacturing line or a lot. As a result, the following problems arise.

(1) In the case that pillar-shaped spacers of stacked a plurality of color layers are disposed on an opposite substrate, an alignment film is disposed on the surface of a switching elements such as TFT and TFD on an active matrix substrate to which the pillar-shaped spacers are disposed proximally. This alignment film is, however, as thin as approximately 1000 Å, and impurities contained in the respective color layers constituting the spacer penetrate enough to reach the TFT. The impurities causing problems are alkali metals and Chlorine (Cl) and Fluorine (F), and the TFT might cause a malfunction because of the impurities.

In this case, impurity content quantities and impurity elution quantities of the respective color layers are different, and hence, when the color layer containing a great deal of impurities comes to a highest layer positioned in the vicinity of the switching element such as the TFT and TFD, this leads to a deterioration in terms of characteristics of the switching element with a diffusion of the impurities into the switching element.

(2) If a hardness of each color layer is different, there might also differ a cut quantity due to rubbing when stuck to an opposite substrate, and therefore a desired gap can not be obtained.

(3) In the case of a multi-gap corresponding method of showing a correspondence to a plurality of gaps by changing a thickness of at least one colored film among thicknesses of a plurality of color layers, a spacer height changes as a stacked sequence varies, and it is impossible to correspond to a predetermined gap.

(4) If a surface roughness of each color layer is different, the predetermined gap can not be obtained because of a difference in strength of the stacked pillar, a difference in collapse quantity when stuck to the opposite substrate, and a difference in degree of contact with the opposite substrate when stuck thereto.

SUMMARY OF THE INVENTION

It is a primary object of the present invention, which was contrived to obviate the problems given above, to provide an inexpensive color display type liquid crystal display device exhibiting a high display quality and a high yield and having a spacer composed of stacked color layers.

According to a first aspect of the present invention, there is provided a liquid crystal display device having:
an active matrix substrate including a plurality of switching elements and a plurality of pixel electrodes;
an opposite substrate including a common electrode;
liquid crystal material sealed in a space between said active matrix substrate and said opposite substrate; and
a pillar-shaped spacer disposed as a stack of a plurality of different color layers on one of said active matrix substrate and said opposite substrate, for keeping a gap between said two substrates, wherein an impurity content quantity of the color layer closest to said switching element is made lowest among the plurality of color layers of said pillar-shaped spacer.

According to a second aspect of the present invention, there is provided a liquid crystal display device of a similar type in which an impurity elution quantity of the color layer closest to said switching element is made lowest among the plurality of color layers of said pillar-shaped spacer.

Since the color layer closest to a switching element among a plurality of stacked color layers constituting a pillar-shaped spacer, has a lowest impurity content quantity or a lowest impurity elution quantities, the liquid crystal display device can be thereby given a stable reliability by reducing an influence of impurities of the color layers upon the switching element such as TFT.

According to a third aspect of the present invention, there is provided a liquid crystal display device of a similar type in which a bridging density of a color layer resin disposed closest to the switching element is made highest among the plurality of color layers.

The resin exhibiting a high bridging density has a small amount of impurity elution and is therefore similarly capable of decreasing the influence of the impurities.

Further, according to a fourth aspect of the present invention, there is provided a liquid crystal display device in which a hardness of a color layer which is disposed at farthest position from a substrate on which the pillar-shaped spacer is disposed among the color layers constituting said pillar-shaped spacer is made lowest among the plurality of color layers.

With this arrangement, when the two substrates are disposed in a face-to-face relationship, the substrates are hard to damage each other.

According to the fifth aspect of the present invention, there is provided a liquid crystal device of a similar type in which color layers of the pillar-shaped spacer excluding a closest color layer from the substrate on which the spacer is disposed are made by hardening color layer material having solid contents before hardening of 30% or less.

BRIEF DESCRIPTION OF THE DRAWINGS

Other objects and advantages of the present invention will become apparent during the following discussion in conjunction with the accompanying drawings, in which:

FIGS. 5A–5E are explanatory diagrams showing an example with a difference in terms of lamination sequence from the lamination sequence in FIGS. 4A–4E when forming the pillar-shaped spacer;

FIGS. 6A–6E are explanatory diagrams showing how the pillar-shaped spacer is formed when solid content densities of respective color layers are different; and FIGS. 7A–7E are explanatory diagrams showing an example with a difference in terms of the lamination sequence from the lamination sequence in FIGS. 6A–6E when forming the pillar-shaped spacer.

DESCRIPTION OF THE PREFERRED EMBODIMENTS

Embodiments of a liquid crystal display device according to the present invention will be described in detail.

Figure 1:
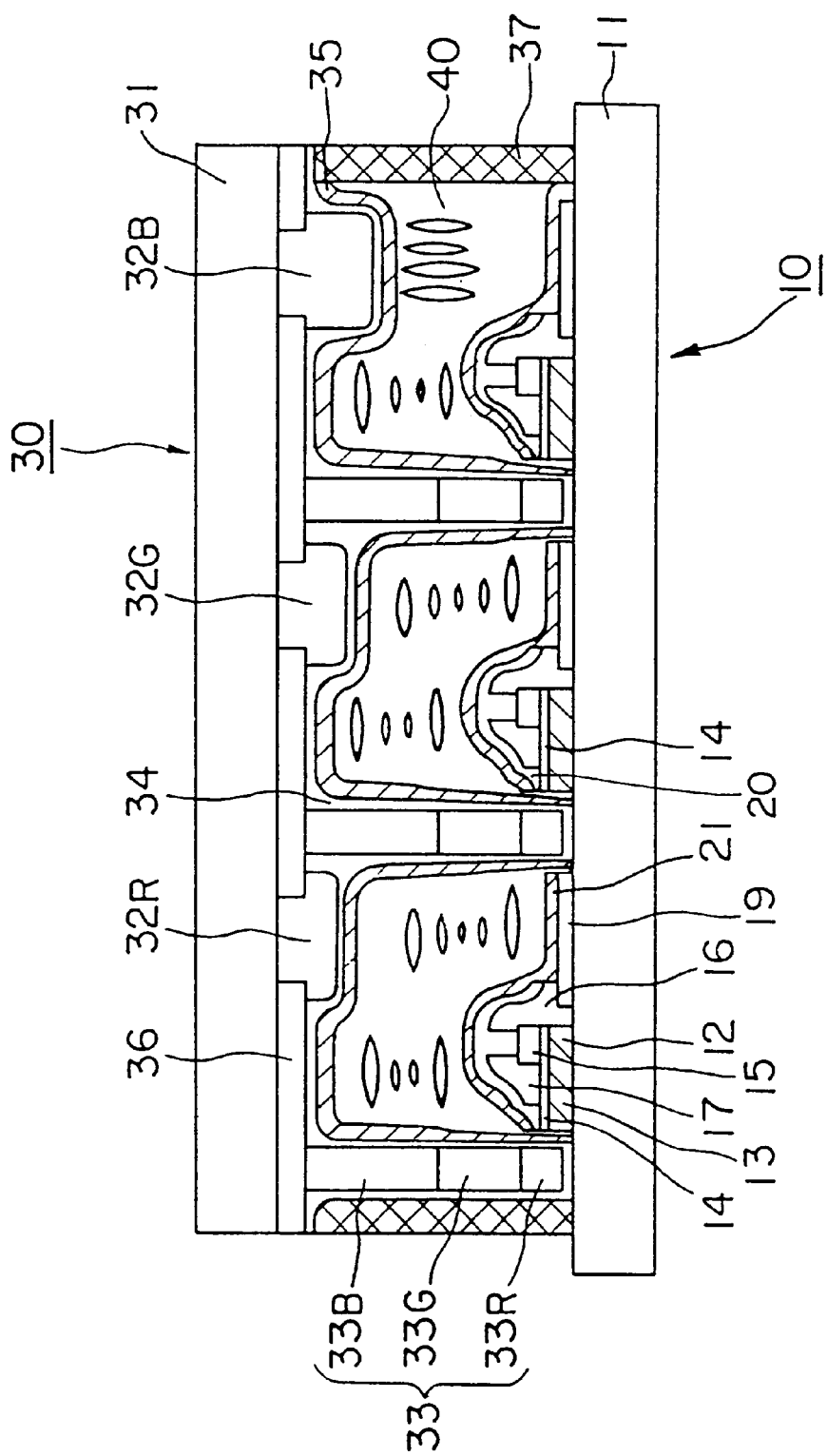
FIG. 1 is a sectional view illustrating a sectional structure of a liquid crystal display device in an embodiment of the present invention.

FIG. 1 is a sectional view illustrating a liquid crystal device in accordance with one embodiment of the present invention. This liquid crystal display device is constructed such that an active matrix substrate 10 is disposed in a face-to-face relationship with an opposite substrate 30, and a liquid crystal material 40 is sealed in therebetween.

A TFT portion on the side of a main surface of a glass substrate 11 of an active matrix substrate 10 is provided with a gate electrode 12, while a wiring portion is provided with a gate line 13, respectively. An insulating film 14 is deposited thereon. A semiconductor film 15 composed of amorphous silicon is disposed upwardly of the gate electrode 12 above that insulating film 14. A source 16 and a drain 17 are disposed over the semiconductor film 15 and the insulating film 14 in such a manner that the source 16 and the drain 17 are disposed in the face-to-face relationship and spaced at a predetermined distance at a central portion of the semiconductor film 15. A signal line (not shown) is so disposed as to be coupled to the drain 17, while a pixel electrode 19 is so disposed as to be coupled to the source 16. Then, a protective film 20 is disposed over an entire surface of the wiring portion as well as of the TFT portion, thus forming an alignment film 21 over an entire surface of the pixel portion.

The opposite substrate 30 includes red, green and blue color layers 32R, 32G and 32B disposed corresponding to pixel positions on the glass substrate 31. Further, color layer materials thereof are stacked, thus-forming a pillar-shaped spacer 33. This spacer 33 is constructed of a red color layer 33R, a green color layer 33G and a blue color layer 33B that correspond to the color layers 32R, 32G and 32B. Then, a transparent electrode film 34 and an alignment film. 35 are disposed over the whole surface thereof. The color layers have their own thicknesses, wherein the blue color layer 33B has a largest thickness, the green color layer 33G has a thickness next to this, and the red color layer 33R has a smallest thickness. Accordingly, a rate of each color layer occupying a height of the spacer is proportional to the thickness of the color layers.

The two substrates are disposed in the face-to-face relationship, and the spacer 33 of the opposite substrate 30 contacts the active matrix substrate 10. Then, the liquid crystal composition 40 is sealed in between the two substrates.

Next, to start with, as in the same way with a process of normally forming TFT, a film formation and patterning are repeated on a #7059™ glass substrate 11 having a thickness of 1.1 mm and made by CORNING CORP., thus forming a thin-film transistor and an electrode wire in matrix. It is herein assumed that an active matrix substrate 10 having totally 10000 pixels, with one set of 100 pixels arrayed lengthwise and another set of 100 pixels arrayed crosswise, respectively, and also an amorphous silicon TFT array. Thereafter, AL-1051™ (made by JAPAN SYNTHETIC RUBBER CO., LTD.) serving as an alignment film material is coated to have a thickness on the order of 500 Å over the whole surface, and a rubbing process is executed, thereby forming an alignment film 21.

Next, on the side of the opposite substrate, a spinner coats a #7059™ glass substrate 31 having a thickness of 1.1 mm and made by CORNING CORP. with such a material that carbon black is diffused on a photo hardening alkali resin that can be alkali-developed, and, after being dried at 90° for 10 minutes, this is exposed with an exposure quantity of 300 mj/cm$^2$ by employing a photo mask having a predetermined pattern configuration. Thereafter, the material is developed in an alkali aqueous solution of pH 11.5 and baked at 200° for an hour, thereby forming a light shield layer 36 having a film thickness of 2.0 μm with lattice patterns. A commercially available colored resist CB-2000™ (made by FUJI-HUNT ELECTRONICS TECHNOLOGY CO., LTD.) that can be alkali-developed is coated on the glass substrate 31 with the light shield pattern 36. After prebaking, the resist is exposed with a predetermined exposure quantity of 100 mj/cm² and developed by a developer of pH 11.5. Thereafter, one-hour baking is executed at 200° C., thereby forming a blue color layer 32B having a film thickness of 2.2 μm. At this time, a pillar-shaped spacer 33B having a diameter of 20 μm is disposed on the light shield layer. Coated on the blue color layer by the spinner is a commercially available colored resist $CG_{-2000}$™ (made by FUJI-HUNT ELECTRONICS TECHNOLOGY CO., LTD.) that can be alkali-developed. After prebaking, the resist is exposed with the predetermined exposure quantity of 100 mj/cm² and developed by the developer of pH 11.5. Thereafter, one-hour baking is executed at 200° C., thereby forming a green color layer 32G having a film thickness of 1.8 μm. At this time, a pillar-shaped spacer 33G having a diameter of 20 μm is disposed on the blue color pillar-shaped spacer 33B. Coated on the blue and green color layers by the spinner is a commercially available colored resist CR-2000™ (made by FUJI-HUNT ELECTRONICS TECHNOLOGY CO., LTD.) that can be alkali-developed. After prebaking, the resist is exposed with the predetermined exposure quantity of 100 mj/cm² and developed by the developer of pH 11.5. Thereafter, one-hour baking is executed at 200° C., thereby forming a red color layer 32R having a film thickness of 1.3 μm. At this time, a pillar-shaped spacer 33R having a diameter of 20 μm is disposed on the blue and green color pillar-shaped spacers 33B and 33G. A common electrode 34 composed of ITO is disposed by the sputtering method, and the alignment film composed of polyimide is formed. Thereafter, an alignment process based on rubbing is carried out, thereby forming an opposite substrate including the color filters and the spacers.

This opposite substrate and the active matrix substrate 30 are disposed in the face-to-face relationship and bonded to each other by a bonding agent 37, and a TN liquid crystal material 40 is injected from a filling port by a normal method, and thereafter the filling port is sealed by an ultraviolet ray hardening resin.

Employed in accordance with this embodiment is the resinous light shield layer with the dispersed black pigment. There may, however, be also used light shield films o a metal group such as Cr, CrO/Cr, CrO/Cr/CrO. Alternatively, no light shield layer may be provided.

Given herein is some consideration of a sequence of forming the color layers.

In accordance with this embodiment, the color layer in closest proximity to the active matrix substrate assumes a ed color (R), an intermediate layer assumes a green color (G), and the color layer farthest therefrom assumes a blue color (B). This order is set as the quantity of impurity contained becomes smaller.

For instance, following Table 1 shows content quantities of Sodium and potassium defined as alkali metals, wherein the content quantities are compared between the respective colors R, G and B.

TABLE 1

|   | Na | K |
|---|----|---|
| B | 75 | 9 |
| G | 50 | 20 |
| R | 12 | 1.3 |

These items of data are obtained as a result of steps of crushing the hardened color layer materials and putting them into a mixed liquid of acetone and water, stirring them for one hour, and making a measurement by the atomic absorption method with an extracted liquid thereof serving as a sample. Accordingly, strictly speaking, that is not the impurity content quantity but an impurity elution quantity.

As for this impurity elution quantity, the quantity of impurities eluted changes even though the same impurities are contained, depending on a type and a quantity of the pigment contained in the color layer, and, therefore, it is preferable that a lamination sequence be determined based on impurity elution quantity data when the impurity elution quantity data are already known.

Accordingly, in accordance with this embodiment, the red color layer has the smallest impurity elution quantity among the three color layers, and hence it is preferable that the red color layer be disposed closer to the active matrix substrate. In this case, the green color layer serves as the intermediate layer, the blue color layer may be the lowest layer as the opposite substrate. Alternatively, the blue color layer may be the intermediate layer, and the green layer may be the lowest layer.

Figure 2:
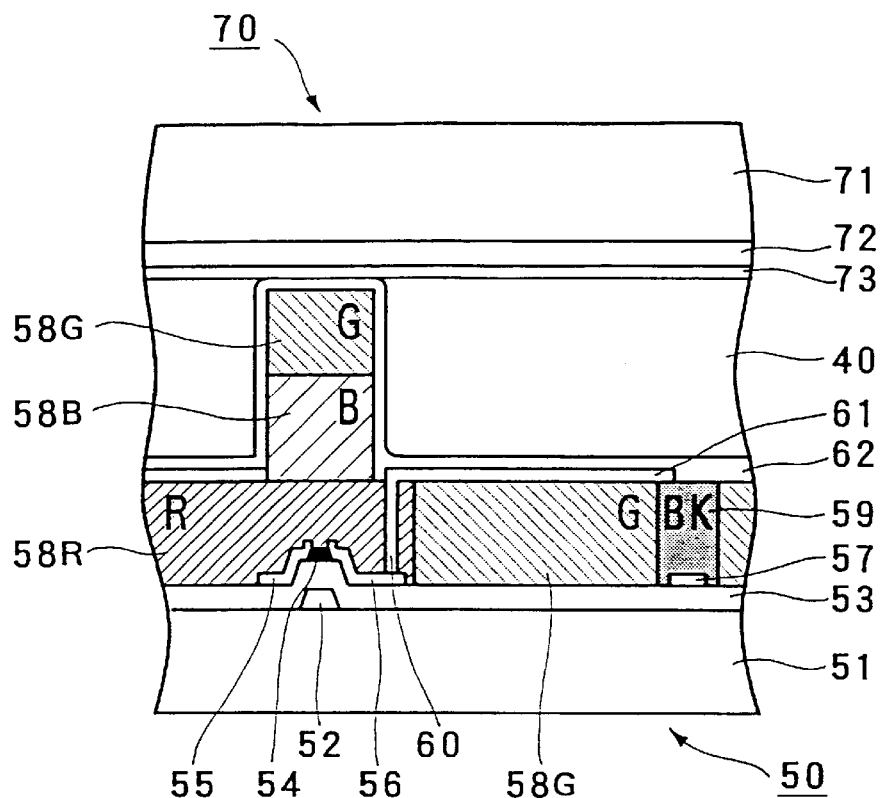
FIG. 2 is a sectional view showing a sectional structure of the liquid crystal display device in another embodiment of the present invention.

FIG. 2 is a sectional view illustrating a construction of a second embodiment of the present invention. Color layers and the stacked spacers are disposed on the active matrix substrate. FIG. 2 is the sectional view taken along the line I–I' in plan view of FIG. 3.

Figure 3:
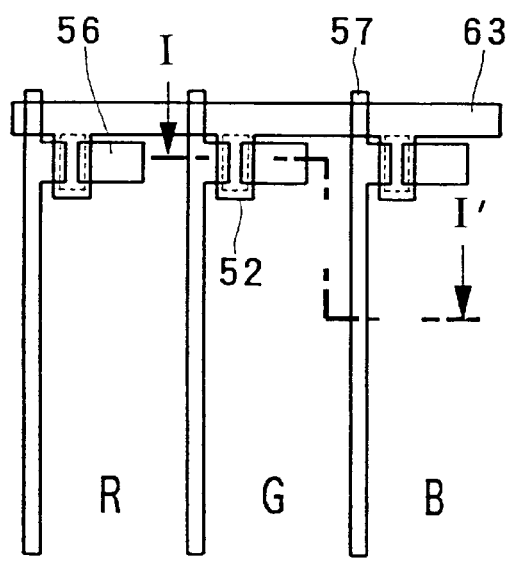
FIG. 3 is a plan view corresponding to FIG. 2.

Referring to FIGS. 2 and 3, this liquid crystal display device is constructed such that an active matrix substrate 50 is disposed in the face-to-face relationship with an opposite substrate 70, and a liquid crystal layer 40 is interposed therebetween. On the active matrix substrate, a plurality of gate lines 62 serving as a gate electrode 52 are disposed on a transparent substrate 51, and an insulating film 53 is deposited over an entire surface of the transparent substrate 51 so as to cover them. Then, a semiconductor layer 54 is disposed in a position corresponding to the gate electrode 52 thereon, and a drain 55 and a source 56 are disposed on both sides thereof. Further, a plurality of signal lines 57 are disposed on the insulating film 53 so as to intersect the gate line 63.

On the elements having such a configuration, color layers 58R, 58G and 58B assuming three colors Red, Green and Blue are disposed in stripe. Especially, a red color layer 58R, a blue color layer 8R and a green layer 58G are stacked on a transistor defined as a switching element consisting of the gate electrode 52, the semiconductor layer 54, the drain 55 and the source 56, thus forming a stacked spacer.

Further, a pixel electrode 61 is provided on color layers and is coupled to, e.g., the source 56 via a through-hole 60 disposed in the color layers.

An alignment film 62 is disposed on an entire surface of these elements having such a configuration.

Next, the opposite substrate 70 is constructed in such a manner that a common electrode 72 and an alignment film 73 are stacked on the whole surface of the transparent substrate 71.

The spacer for holding a distance between the active matrix substrate and the opposite substrate is disposed by stacking spacer color layers disposed by the same step as the step of forming the respective color layers of the filters on the active matrix substrate. Hence, as obvious from the Figure, the red color layer containing, as explained above, the least alkali metal impurity content quantity is disposed on a portion where the switching element exists.

Note that a stacked filter is formed on the TFT according to the construction shown in FIG. 2. This exemplifies such an arrangement that the wire increasingly becomes thinner in order to enhance an opening rate with a recent high demand for increasing the luminance of the liquid crystal display device, and a place for disposing the space is therefor restricted with the result that the spacer is disposed on the TFT.

In the structure where such color layers are disposed on the active matrix substrate too, when an impurity content of the color layer in closest proximity to the active matrix substrate is 1000 ppm or under, there might be very little possibility in which the impurities eluted from the stacked spacer exerts an adverse influence upon the transistor. Furthermore, impurity elution quantity is 100 ppm or under, there might be very little possibility in which the impurities exerts an adverse influence upon the transistor.

Note that the concerns in the embodiment are concentrated on the alkali metal, but, in the case of paying attention to other impurities, the impurity content quantity of the color layer exclusive of the red color layer is minimum as the case may be. In this case, the color layer with the minimum impurity content quantity can be selected as a layer closest to the active matrix substrate.

With this selection, the influence of the impurities on the switching element such as the TFT is reduced, thereby making it possible to give a stable reliability.

Further, a bridging density of the resin which composes the color layer can be increased by the color layer disposed in close proximity to the active matrix substrate. The reason for this is that it is empirically known that the impurity elution of the alkali metal becomes less with a higher bridging density.

Further, generally the color layers are different in terms of types and quantities of the content impurities depending on the colors, and therefore physical properties such as a surface roughness and hardness an chemical properties such as viscosity and thermal decomposition temperature, are also different. A variety of functions can be given to the spacer by making use of this.

For example, it is presumed that the color layers constituting the pillar-shaped spacer have different hardness.

In this case, the tip of the pillar-shaped spacer is brought into contact, and hence a hardness of the tip thereof is set according to a purpose.

At first, the hardness of the highest layer can be set larger than the hardness of other layers. In this case, abrasion of the highest layer is hard to occur due to the contact when stuck to the active matrix substrate. Also, the highest layer is also hard to collapse against a pressure given from the tip of the pillar-shaped spacer, and a diameter of the spacer can be stably held, thereby making it feasible to prevent an extension of an areal size with which the layer contacts the active matrix substrate.

Such an example might include a case where the hardness sequentially increases from the lowest layer to the highest layer, a case where the hardness decreases sequentially from the highest layer, the lowest layer and the intermediate layer, a case where only the highest layer and the intermediate layer are smaller in surface roughness than other layers, a case where the hardness of the highest layer and of the intermediate layer are larger than the hardness of the lowest layer, and a case where the hardness of only the highest layer is larger than those of other layers.

Reversely, the hardness of the highest layer can be set smaller than the hardness of other layers. In this instance, when contacting the active matrix substrate, the active matrix substrate is hard to damage.

This exemplification might include a case where the hard sequentially decreases from the lowest layer toward the highest layer, a case where the hardness of the highest layer is smaller than those of the intermediate layer and the lowest layers, a case where the hardness of the highest layer is smaller than those of the intermediate layer and the lowest layer, and a case where the hardness decreases sequentially from the intermediate layer, the lowest layer and the highest layer.

If the stacking sequence is determined taking such properties into consideration, the spacer can be given fixed characteristics about deformations and flaws, and reversely the properties can be stably maintained by fixing the stacking sequence.

The biggest problem is that spacers disposed on the opposite substrate cause the flaws in the active matrix substrate when the active matrix substrate and the opposite substrate are bonded, and therefore, according to the present invention, the hardness of the highest color layer of the stacked spacer is set at the minimum among the stacked color layers. The similar phenomena are observed in the case wherein spacers are disposed on the active matrix substrate. In this case, flaws are caused in the opposite substrate. Since flaws of opposite substrate mean flaws of aligning film which aligns liquid crystal material, display performance would be deteriorated.

Next, it is assumed that there differ the surface roughnesses of at least the two layers contacting each other among the colored layers constituting the pillar-shaped spacer.

In this case, if the upper color layer of the two layers contacting each other has a smaller surface roughness than that of the lower color layer, there must be such an advantage that a force of adhesion increases because of a larger surface roughness of the lower layer. Such an example might include a case where the surface roughness decreases sequentially from the lowest layer toward the highest layer, a case where the surface roughness of only the highest layer is smaller than those of other layers, and a case where the surface roughnesses of the highest layer and of the intermediate layer are smaller than that of the lowest layer.

Further, the surface roughness of the highest color layer among the color layers constituting the pillar-shaped spacer may be smaller than the surface roughness of other lower color layers. This exemplification may include a case where the surface roughness decreases sequentially from the lowest layer toward the highest layer, a case where the surface roughness of the highest color layer is minimum with the intermediate layer being maximum and the lowest layer being intermediate in surface roughness, a case where the surface of the highest layer is smaller than those of other layers, and a case where the surface roughnesses of the highest and intermediate layers are small while the lowest layer has a large surface roughness.

Among those cases, the maximum strength can be obtained by the arrangement in which the surface roughness decreases sequentially from the lowest layer toward the highest layer, and the stable strength can be also obtained reversely by fixing the stacking sequence.

Further, if the surface roughness of the spacer portion contacting the active matrix substrate is large, the areal size for the contact with the active matrix substrate can be reduced, thereby making it feasible to reduce the damage to the active matrix substrate.

Given further is a contemplation about a final influence, upon the height of the spacer, of the sequence of forming the color layers in the stacking process of repeating the coating and hardening as well.

In the embodiment shown in FIG. 1, the thicknesses of the color layers forming the color filters are different from each other. If the film thicknesses of the color layers are different as described above, the height of the pillar-shaped spacer differs by changing the stacking sequence.

FIGS. 4A–4E and 5A–5E show how this is done.

Now, supposing that the color layers R (Red), G (green) and B (Blue) are to be disposed, desired thicknesses thereof are 3 $\mu$m, 2 $\mu$m and 1 $\mu$m, and a density of solid content of each unhardened color layer material before application is 20%. Accordingly, the material of each color layer is, after undergoing the drying process, exposure process, developing process and baking process, shrunk down to a thickness that is ⅕ the thickness when being coated.

Figure 4A:
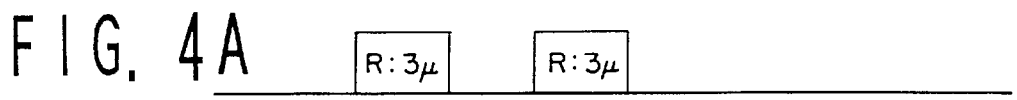
FIGS. 4A–4E are explanatory diagrams showing how a pillar-shaped spacer is formed.
Figure 4B:
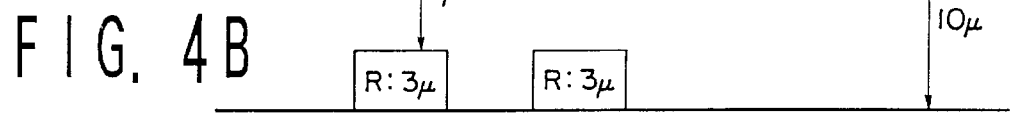
Figure 4C:
Figure 4D:
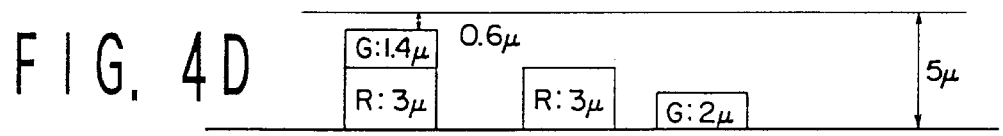
Figure 4E:
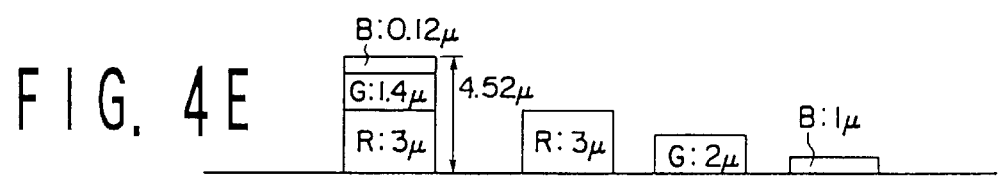

To begin with, if it is assumed that the pillar-shaped spacer is disposed by stacking the color layers in the sequence of R, G and B, after forming a first R color layer having a thickness of 3 $\mu$m and also the spacer portion (FIG. 4A), a G color layer material is coated to a thickness of 10 $\mu$m in order for a next G color layer to have a thickness of 2 $\mu$m (FIG. 4B). On this occasion, it follows that the G color layer is coated to a thickness of 7 $\mu$m on the R color layer already formed to the thickness of 3 $\mu$m. Therefore, after being hardened, the G color layer in the spacer portion comes to have a thickness of 1.4 $\mu$m (FIG. 4C). Next, when a B color layer material is coated to a thickness of 5 $\mu$m in order for a next B color layer to have a thickness of 1 $\mu$m, it follows that a coating thickness thereof in the pillar-shaped spacer portion is 0.6 $\mu$m and, after being hardened, becomes 0.12 $\mu$m. Accordingly, the height of the spacer column is totally 4.52 $\mu$m.

Next, as illustrated in FIG. 5, if it is assumed that the spacer is formed by stacking the color layers in the sequence of B, G, and R under the same film thickness condition, after forming the first B color layer (FIG. 4D), and when the G color layer material is coated to the thickness of 10 $\mu$m in order for the G color layer to have the thickness of 2 $\mu$m (FIG. 5B), the film thickness in the spacer portion becomes 9 $\mu$m. When hardening this, the G color layer in the spacer portion comes to have a thickness of 1.8 $\mu$m (FIG. 5C). Next, when the R color layer material is coated to a thickness of 15 $\mu$m in order to form the R color layer (FIG. 5D), the thickness in the spacer portion is 12.2 $\mu$m and, after being hardened, comes to have 2.44 $\mu$m (FIG. 5E). Accordingly, the height of the spacer column is totally 5.24 $\mu$m and is therefore thicker by 0.72 $\mu$m than in the case of R, G and B.

In accordance with this embodiment, the density of the solid content of color layer material at the application is fixed, and, if the stacking sequence is differs even in such a case that the film thickness of each color layer is fixed while the density of solid content is different, the height of the spacer changes. FIGS. 6A–6E and 7A–7E show how this is done. Herein, it is assumed that desired thicknesses of the color layers R, G and B are all set to, e.g., $\mu$m, and respective solid content densities of color layer material before their application are set to 15%, 20% and 25%, respectively.

To start with, when the pillar-shaped spacer is formed by stacking the color layers in such a sequence as R, G and B, and after forming the first R color layer having a thickness of 2 $\mu$m and also the spacer portion (FIG. 6A), the G color layer material is coated to the thickness of 10 $\mu$m in order for the next G color layer to have the thickness of 2 $\mu$m (FIG. 6B). On this occasion, it follows that the G color layer material is coated to a thickness of 8 $\mu$m on the R color layer already formed to the thickness of 2 $\mu$m. Therefore, after being hardened, the G color layer in the spacer portion comes to have a thickness of 1.6 $\mu$m (FIG. 6C). Next, when the B color layer material is coated to a thickness of 8 $\mu$m in order for the next B color layer to have a thickness of 2 $\mu$m (FIG. 6D), it follows that a coating thickness thereof in the pillar-shaped spacer portion is 4.4 $\mu$m and, after being hardened, becomes 1.1 $\mu$m (FIG. 6E). Accordingly, the height of the spacer column is totally 4.7 $\mu$m.

Next, if it is assumed that the spacer is formed by stacking the color layers in the sequence of B, G, and R under the same film thickness condition, after forming the first B color layer (FIG. 7A), ad when the G color layer material is coated to the thickness of 10 $\mu$m in order for the G color layer to have the thickness of 2 $\mu$m, the film thickness in the spacer portion becomes 8 $\mu$m. When hardening this, the G color layer in the spacer portion comes to have a thickness of 1.6 $\mu$m (FIG. 7C). Next, when the R color layer material is coated to a thickness of 13.33 $\mu$m in order to form the R color layer (FIG. 7D), the thickness in the spacer portion is 9.73 $\mu$m and, after being hardened, comes to have 1.46 $\mu$m (FIG. 7E). Accordingly, the height of the spacer column is totally 5.06 $\mu$m and is therefore thicker by 0.36 $\mu$m than in the case of R, G and B.

As described above, if the thicknesses of the color layers different, the spacer height changes with variations in the stacking sequence. It is possible to provide a multi-gap correspondence in which the gap is varied by exploiting such a characteristic. If required to obtained a large gap, the layers are stacked in such a sequence that the film thickness becomes smaller. Whereas if required to obtain a small gap, the layers are stacked in such a sequence that the film-thickness becomes larger.

Furthermore, if the film thickness is fixed while the solid contents of color layer materials before application are different, the layers may be stacked in such a sequence that the solid content density becomes larger in order to obtain a large gap. The layers may be stacked in such a sequence that the solid content density becomes smaller in order to obtain a small gap.

In this case, it is preferable that color layers excluding a color layer disposed closest to the surface of the substrate are formed by hardening color materials having their solid contents before the hardening are 30% or less.

The reason thereof will now be explained.

When a first color layer which is the closest layer to the surface substrate is formed, a desired thickness can be obtained irrespective of its solid contents. Supposing a three-layer stacked spacer, actual thickness of liquid crystal is determined by the second and third color layers. Since the thickness of the liquid crystal is required for 4–5 $\mu$m, it is necessary for the second and third layers to have total thickness of 4–5 $\mu$m. On the other hand, each color layer is required to have thickness of 2–3 $\mu$m. When the second color layer is formed, its solid contents before hardening should be 30% or less for satisfying the requirements of the color layers and the spacer. The same condition is also applicable to the third layer.

The thus formed color display type active matrix liquid crystal display device is capable of exhibiting a stably high quality by keeping the cell gap uniform while holding the color layer sequence in a fixed manner. Reversely obtaining the fixed gap entails fixing the stacking sequence. In the case of such a type that predetermined film thicknesses of the color layers are different, the film thicknesses and the stacking sequence, which have been once determined, are required to be kept.

With this operation, the fixed film thickness can be obtained by fixing the stacking sequence with respect to the same type of liquid crystal display device, whereby a desired gap can be surely acquired.

The embodiment discussed above are not limitative.

For example, the pillar-shaped spacer is formed by stacking the three color layers in the embodiments discussed above, but two color layers are also available.

Moreover, the photosensitive colored resist has been described in the embodiments discussed above. However, the material with diffused pigment into a non-photosensitive resin is formed with a pattern by the normal photography step, and the method is not confined to the embodiments discussed above.

Further, the configuration of the pillar-shaped spacer has been explained as a cylindrical shape in the embodiments discussed above, but an elliptical column may also be available.

Moreover, in the embodiments discussed above, the light shield layer is disposed as the lowest layer but may be disposed as the highest color layer or disposed between the color layers.

According to the present invention, the height of or the characteristic possessed by the spacer is varied by changing the stacking sequence of the color layers of the pillar-shaped spacer constructed in the form of the stack of the color layers assuming a plurality of different colors. The stacking sequence is fixed based on the same type, thereby making it possible to obtain the spacer having the fixed height and characteristic. Besides, the desired height and characteristic can be acquired by changing the stacking sequence.

It is apparent that, in this invention, a wide range of different working modes can be embodied based on the invention without deviating from the spirit and scope of the invention. This invention is not restricted by its specific working modes except being limited by the appended claims.

What is claimed is:

1. A method of manufacturing a color filter substrate for a liquid crystal display device comprising:
    a first step of coating a color layer material on a substrate;
    a second step of hardening and patterning the color material to form a color filter layer and a spacer layer; and
    a third step of repeating said first and second steps for other color layer materials to form a plurality of color filters and a spacer having stacked layers of said other color layer materials,
    wherein coatings are performed in an order of low to high density of solid content contained in said color layer materials and thicknesses of hardened color filter layers are substantially the same.

2. A method of manufacturing a color filter substrate for a liquid crystal display device comprising:
    a first step of coating a color layer material on a substrate;
    a second step of hardening and patterning the color material to form a color filter layer and a spacer layer; and
    a third step of repeating said first and second steps for other color materials to form a plurality of color filters and a spacer having stacked spacer layers of said plurality of color layer materials,
    wherein densities of solid content contained in said color layer materials are substantially the same and said coating is performed in an order of thin to thick thicknesses of the color filter layers when hardened.

3. A method of manufacturing a color filter substrate for a liquid crystal display device comprising the steps of:
    coating a first color layer material on a substrate;
    hardening and patterning the first color layer material to form a first spacer layer and a first color filter layer;
    coating a second color layer material having higher density of solid content than that of the first color layer material to cover the first spacer layer and the first color filter layer;
    hardening and patterning said second color layer material to form a second spacer layer stacked on the first spacer layer and a second color filter layer having substantially the same thickness as that of the first color filter layer;
    coating a third color layer material having a higher density of solid content than that of the second color layer material to cover the first spacer layer, the second spacer layer, the first color filter layer, and the second color filter layer;
    hardening and patterning said third color layer material to form a third spacer layer stacked on the second spacer layer and a third color filter layer having substantially the same thickness as that of the first and second color filter layers.

4. A method of manufacturing a color filter substrate for a liquid crystal display device comprising the steps of:
    coating a first color layer material on a substrate;
    hardening and patterning the first color layer material to form a first spacer layer and a first color filter layer;
    coating a second color layer material having substantially the same density of solid content as that of the first color layer material to cover the first spacer layer and the first color filter layer;
    hardening and patterning said second color layer material to form a second spacer layer stacked on the first spacer layer and a second color filter layer which is thicker than the first color filter layer;
    coating a third color layer material having substantially the same density of solid content as that of the first and the second color layer materials to cover the first spacer layer, the second spacer layer, the first color filter layer, and the second color filter layer;
    hardening and patterning said third color layer material to form a third spacer layer stacked on the second spacer layer and a third color filter layer which is thicker than the second color filter layer.

5. A method of manufacturing a color liquid crystal display device comprising the steps of:
    preparing two substrates, one being an active matrix substrate and the other being an opposing substrate;
    forming color filters on either one of the two substrates, to form a color filter substrate, in the sequence having:
    a first step of coating a color layer material on a substrate;

a second step of hardening and patterning the color material to form a color filter layer and a spacer layer;

a third step of repeating said first and second steps for other color layer materials to form a plurality of color filters and a spacer having stacked layers of said other color layer materials, coatings being performed in an order of low to high density of solid content contained in said color layer materials and thicknesses of hardened color filter layers are substantially the same;

disposing said active matrix substrate and said opposing substrate in opposing manner; and filling liquid crystal material in a space between the two substrates.

6. A method of manufacturing a color liquid crystal display device comprising the steps of:

preparing two substrates, one being an active matrix substrate and the other being an opposing substrate;

forming color filters on either one of the two substrates, to form a color filter substrate, in the sequence having:

a first step of coating a color layer material on a substrate;

a second step of hardening and patterning the color layer material to form a color filter layer and a spacer layer;

a third step of repeating said first and second steps for other color layer materials to form a plurality of color filter layers and a spacer having stacked spacer layers of said plurality of color layer materials, densities of solid content contained in said color layer materials being substantially the same and said coating being performed in an order of thin to thick thicknesses of the color filter layers when hardened;

disposing said active matrix substrate and said opposing substrate in an opposing manner; and filling liquid crystal material in a space between the two substrates.

7. A method of manufacturing a color liquid crystal display device comprising the steps of:

preparing an active matrix substrate;

preparing a color filter substrate in accordance with the substeps of:

coating a first color layer material on a substrate;

hardening and patterning the first color layer material to form a first space layer and a first color filter layer;

coating a second layer material having a higher density of solid content than that of the first color layer material to cover the first spacer layer and the first color filter layer;

hardening and patterning said second color layer material to form a second spacer stacked on the first spacer layer and a second color filter layer having substantially the same thickness as that of the first color filter layer;

coating a third color layer material having a higher density of solid content than that of the second color layer material to cover the first spacer layer, the second spacer layer, the first color filter layer, and the second color filter spacer layer;

hardening and patterning said third color layer material to form a third spacer layer stacked on the second spacer layer and a third color filter layer having substantially the same thickness as that of the first and second color filter layers, disposing said active matrix substrate and said color filter substrate in an opposing manner; and filling liquid crystal material in a space between the two substrates.

8. A method of manufacturing a color liquid crystal display device comprising the steps of:

preparing an active matrix substrate;

preparing a color filter substrate in accordance with the substeps of:

coating a first color layer material on a substrate;

hardening and patterning the first color layer material to form a first spacer layer and a first color filter layer;

coating a second color layer material having substantially the same density of solid content as that of the first color layer material to cover the first spacer layer and the first color filter layer;

hardening and patterning said second color layer material to form a second spacer layer stacked on the first spacer layer and a second color filter layer which is thicker than the first color filter layer;

coating a third color layer material having substantially the same density of solid content as that of the first and the second color layer materials to cover the first spacer layer, the second spacer layer, the first color filter layer and the second color filter layer;

hardening and patterning said third color layer material to form a third spacer layer stacked on the second spacer layer and a third color filter layer which is thicker than the second color filter layer;

disposing said active matrix substrate and said color filter substrate in an opposing manner; and filling liquid crystal material in a space between the two substrates.

9. A color liquid crystal display device manufactured by a process comprising the steps of:

preparing two substrates, one being an active matrix substrate and other being an opposing substrate;

forming color filters on either one of the two substrates, to form a color filter substrate, in accordance with the following substeps:

a first substep of coating a color layer material on a substrate;

a second substep of hardening and patterning the color layer material to form a color filter layer and a spacer layer;

a third substep of repeating said first and second substeps for other color layer materials to form a plurality of color filters and a spacer having stacked layers of said other color layer materials, coatings being performed in an order of low to high density of solid content contained in said color layer materials and thicknesses of hardened color filter layers being substantially the same;

disposing said active matrix substrate and said opposing substrate in an opposing manner; and filling liquid crystal material in a space between the two substrates.

10. A color liquid crystal display device manufactured by a process comprising the steps of:

preparing two substrates, one being an active matrix substrate and other being an opposing substrate;

forming color filters on either one of the two substrates, to form a color filter substrate, in accordance with the following substeps:

a first substep of coating a color layer material on a substrate;

a second substep of hardening and patterning the color layer material to form a color filter layer and a spacer layer;

a third substep of repeating said first and second substeps for other color layer materials to form a plurality of color filters and a spacer having stacked spacer layers of said other color layer materials, densities of solid content contained in said color layer materials being substantially the same and said coating being performed in an order of thin to thick thicknesses of the color filter layers when hardened;

disposing said active matrix substrate and said opposing substrate in opposing manner; and filling liquid crystal material in a space between the two substrates.

11. A color liquid crystal display device manufactured by a process comprising the steps of:

preparing an active matrix substrate;

preparing a color filter substrate in accordance with the substeps of:

coating a first color layer material on a substrate;

hardening and patterning the first color layer material to form a first spacer layer and a first color filter layer;

coating a second color layer material having a higher density of solid content than that of the first color layer material to cover the first spacer layer and the first color filter layer;

hardening and patterning said second color layer material to form a second spacer layer stacked on the first spacer layer and a second color filter layer having substantially the same thickness as that of the first color filter layer;

coating a third color layer material having a higher density of solid content than that of the second color layer material to cover the first spacer layer, the second spacer layer, the first color filter layer and the second color filter layer;

hardening and patterning said third color layer material to form a third spacer layer stacked on the second spacer layer and a third color filter layer having substantially the same thickness as that of the first and second color filter layers, disposing said active matrix substrate and said color filter substrate in an opposing manner; and filling liquid crystal material in a space between the two substrates.

12. A color liquid crystal display device manufactured by a process comprising the steps of:

preparing an active matrix substrate;

preparing a color filter substrate in accordance with the substeps of:

coating a first color layer material on a substrate;

hardening and patterning the first color layer material to form a first spacer layer and a first color filter layer;

coating a second color layer material having substantially the same density of solid content as that of the first color layer material to cover the first spacer layer and the first color filter layer;

hardening and patterning said second color layer material to form a second spacer layer stacked on the first spacer and a second color filter layer which is thicker than the first color filter layer;

coating a third color layer material having substantially the same density of solid content as that of the first and the second color layer materials to cover the first spacer layer, the second spacer layer, the first color filter layer, and the second color filter layer;

hardening and patterning said third color layer material to form a third spacer layer stacked on the second spacer layer and a third color filter layer which is thicker than the second color filter layer, disposing said active matrix substrate and said color filter substrate in an opposing manner; and filling liquid crystal material in a space between the two substrates.

* * * * *

UNITED STATES PATENT AND TRADEMARK OFFICE
CERTIFICATE OF CORRECTION

PATENT NO. : 6,287,733 B1
DATED : September 11, 2001
INVENTOR(S) : Miyazaki et al.

It is certified that error appears in the above-identified patent and that said Letters Patent is hereby corrected as shown below:

<u>Column 14,</u>
Line 40, change "patteming" to -- patterning --.

Signed and Sealed this

Thirtieth Day of April, 2002

Attest:

JAMES E. ROGAN
*Attesting Officer*     *Director of the United States Patent and Trademark Office*